(12) United States Patent
Hall

(10) Patent No.: US 8,083,014 B1
(45) Date of Patent: Dec. 27, 2011

(54) UNDERCARRIAGE FOR A TRACKED VEHICLE

(76) Inventor: Ronald Hall, Woodstock (CA)

( * ) Notice: Subject to any disclaimer, the term of this patent is extended or adjusted under 35 U.S.C. 154(b) by 14 days.

(21) Appl. No.: 12/796,910

(22) Filed: Jun. 9, 2010

(51) Int. Cl.
*B62D 55/04* (2006.01)

(52) U.S. Cl. .......................... 180/9.1; 180/9.5; 180/9.52

(58) Field of Classification Search .................. 180/9.5, 180/9.46, 9.48, 9.62, 9.28, 9.1, 9; 403/150, 403/152, 157
See application file for complete search history.

(56) References Cited

U.S. PATENT DOCUMENTS

| | | | |
|---|---|---|---|
| 4,324,303 A * | 4/1982 | Balzer et al. .................... | 180/9.5 |
| 4,387,779 A | 6/1983 | Pisani | |
| 4,650,259 A | 3/1987 | Alexander et al. | |
| 4,838,373 A | 6/1989 | Price et al. | |
| 5,293,948 A | 3/1994 | Crabb | |
| 6,145,609 A | 11/2000 | Hoelscher | |
| 6,298,933 B1 * | 10/2001 | Simmons ........................ | 180/9.5 |
| 6,378,635 B1 * | 4/2002 | Yoshida et al. ................ | 180/9.5 |
| 7,516,805 B2 | 4/2009 | Bedford et al. | |
| 2003/0116366 A1 * | 6/2003 | Simmons ........................ | 180/9.62 |
| 2006/0131083 A1 * | 6/2006 | Matthys et al. ................. | 180/9.5 |

FOREIGN PATENT DOCUMENTS

| | | |
|---|---|---|
| WO | WO 94/07736 | 4/1994 |
| WO | WO 2007/114644 | 10/2007 |

* cited by examiner

*Primary Examiner* — Paul N Dickson
*Assistant Examiner* — Tashiana Adams
(74) *Attorney, Agent, or Firm* — Katten Muchin Rosenman LLP

(57) ABSTRACT

In a first aspect, the invention is directed to an undercarriage for a tracked vehicle. The undercarriage includes a main frame including a frame body and an equalizer bar extending laterally on either side of a pivot connection with the frame body, a first track frame and a second track frame. A first front spherical bearing connects a first end of the equalizer bar and the front end of the first track frame. A second front spherical bearing connects a second end of the equalizer bar and the front end of the second track frame. A first rear spherical bearing connects the rear end of the main frame to the rear end of the first track frame. A second rear spherical bearing connects the rear end of the main frame to the rear end of the second track frame. The spherical bearings between the rear end of the main frame and the rear ends of the track frames permit the rear ends of the track frames to accommodate the arcuate movement of the front ends of the track frames as the equalizer bar pivots about its pivot connection when the vehicle travels over uneven terrain. The spherical bearings further on both the front and the rear of the vehicle also permit the tracks of the vehicle to more fully contact the ground when the ground is not perfectly flat. An example of such a situation may be when the vehicle travels on a road which is crowned.

12 Claims, 13 Drawing Sheets

UNDERCARRIAGE FOR A TRACKED VEHICLE

FIELD OF THE INVENTION

The present invention relates to tracked vehicles and more particularly to tracked vehicles that have an undercarriage that incorporates an equalizer bar.

BACKGROUND OF THE INVENTION

Tracked vehicles are in widespread use in several industries, such as construction and farming to name but a few. These vehicles are typically used on terrain that is uneven. These vehicles often include an undercarriage that permits the left and right track assemblies to accommodate the unevenness of the terrain. For example, the main frame of the undercarriage may include a laterally extending equalizer bar at the front which pivots relative to the rest of the undercarriage and which is connected at its ends to the fronts of the track frames. The equalizer bar permits the fronts of the left and right track frames to rise and drop relative to the main frame. Typically, there is no equalizer bar at the rear of the main frame, however and so the rears of the track frames are connected to the main frame via a pin joint. The pin joints permit the rears of the track frames to pivot as necessary while the fronts of the track frames to rise and drop. It has been found, however, that the pin joints are prone to seizing and to inhibit this, they are typically manufactured with a lot of play in them. This play, however, can contribute to premature wear in the rear joints, and so the rear joints can in some cases require frequent and expensive maintenance.

It would be advantageous to provide an undercarriage for a tracked vehicle that at least partially overcame the aforementioned problem.

SUMMARY OF THE INVENTION

In a first aspect, the invention is directed to an undercarriage for a tracked vehicle. The undercarriage includes a main frame including a frame body and an equalizer bar extending laterally on either side of a pivot connection with the frame body, a first track frame and a second track frame. A first front spherical bearing connects a first end of the equalizer bar and the front end of the first track frame. A second front spherical bearing connects a second end of the equalizer bar and the front end of the second track frame. A first rear spherical bearing connects the rear end of the main frame to the rear end of the first track frame. A second rear spherical bearing connects the rear end of the main frame to the rear end of the second track, frame. The spherical bearings between the rear end of the main frame and the rear ends of the track frames permit the rear ends of the track frames to accommodate the arcuate movement of the front ends of the track frames as the equalizer bar pivots about its pivot connection when the vehicle travels over uneven terrain. The spherical bearings further on both the front and the rear of the vehicle also permit the tracks of the vehicle to more fully contact the ground when the ground is not perfectly flat. An example of such a situation may be when the vehicle travels on a road which is crowned.

In a preferred embodiment, the equalizer bar is a front equalizer bar and the main frame further includes a rear equalizer bar, which extends laterally on either side of another pivot connection with the main frame. The rear spherical bearings connect between the rear equalizer bar and the track frames.

In a preferred embodiment (with or without the rear equalizer bar), the spherical bearings are made from cast steel ball trunnions which extend laterally from the main frame, and cast steel ball trunnion support members which extend vertically and which support the cast steel ball trunnions. Such an arrangement is particularly advantageous in that it has been found that they do not require externally provided lubrication (eg. grease or oil) in order to operate. During use, they can pivot as necessary for operation of the tracked vehicle without such lubrication, which eliminates a maintenance task in respect of keeping the tracked vehicle in good operating condition.

BRIEF DESCRIPTION OF THE DRAWINGS

The present invention will now be described by way of example only with reference to the attached drawings, in which.

DETAILED DESCRIPTION OF THE INVENTION

Figure 1:
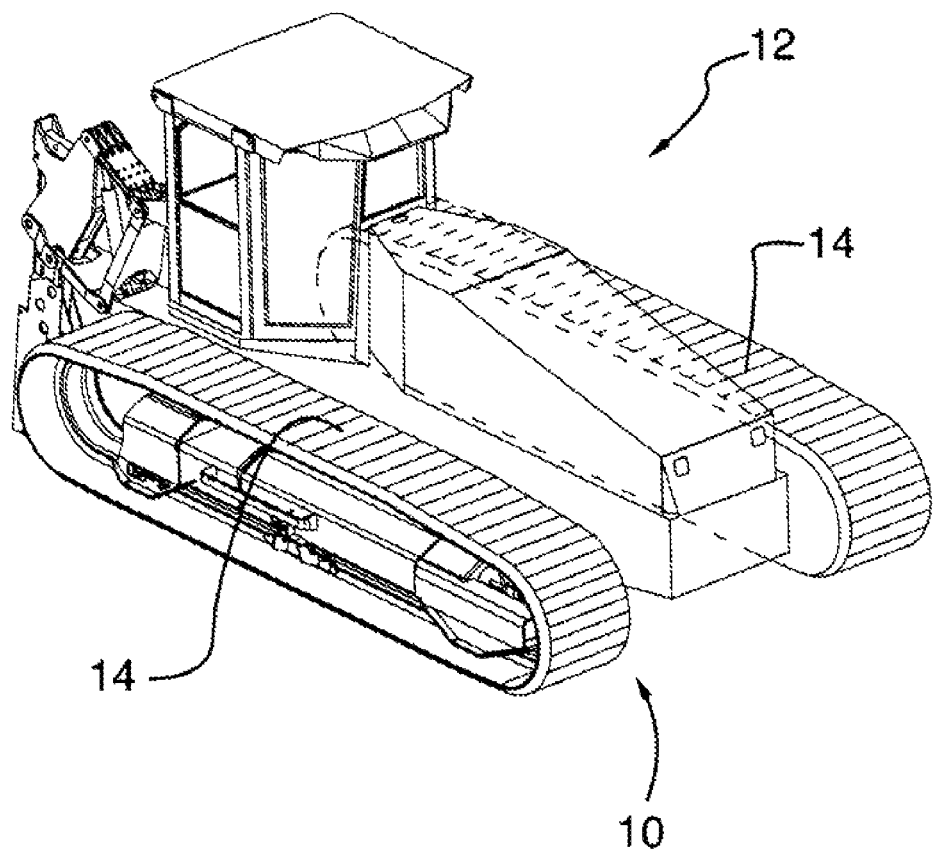
FIG. 1 is a perspective view of a tracked vehicle with an undercarriage in accordance with an embodiment of the present invention.

Reference is made to FIG. 1, which shows an undercarriage 10 for a tracked vehicle 12 in accordance with an embodiment of the present invention. The tracked vehicle 12 may be any type of tracked vehicle, such as, for example, a bulldozer, an excavator, a tractor, a trencher, a pipelayer, a brush tractor and a utility plow, a tracked trailer.

The undercarriage 10 permits the tracked vehicle to drive over uneven terrain, while being configured to require relatively less maintenance than some undercarriages of the prior art. Furthermore, the undercarriage 10 is also configured to permit the tracks of the vehicle 12 (which are shown at 14) to more fully contact the ground in some instances, as compared to the contact provided by certain prior art vehicles.

Figure 2A:
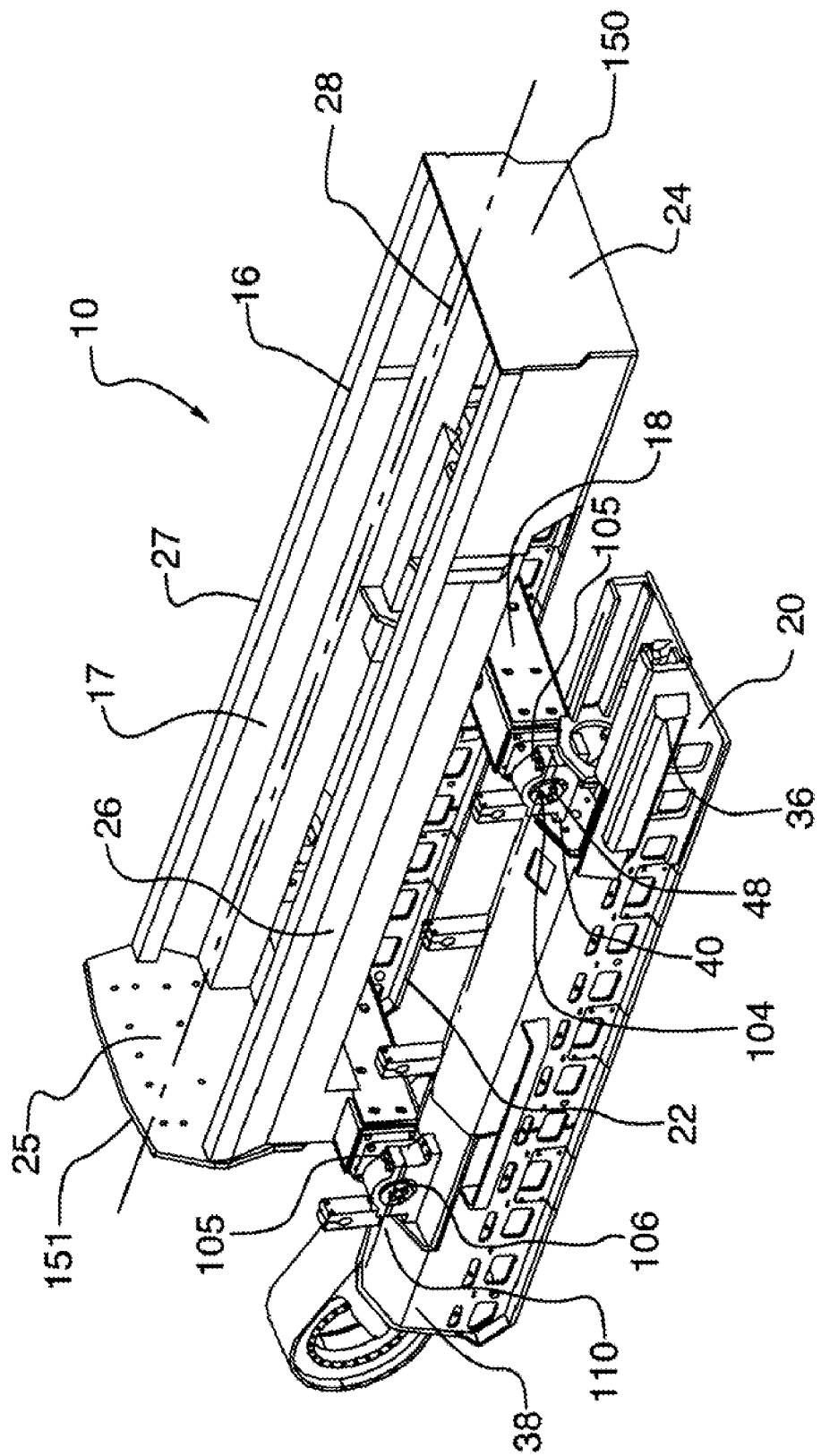
FIG. 2a is a perspective view of one side of the undercarriage shown in FIG. 1.
Figure 2B:
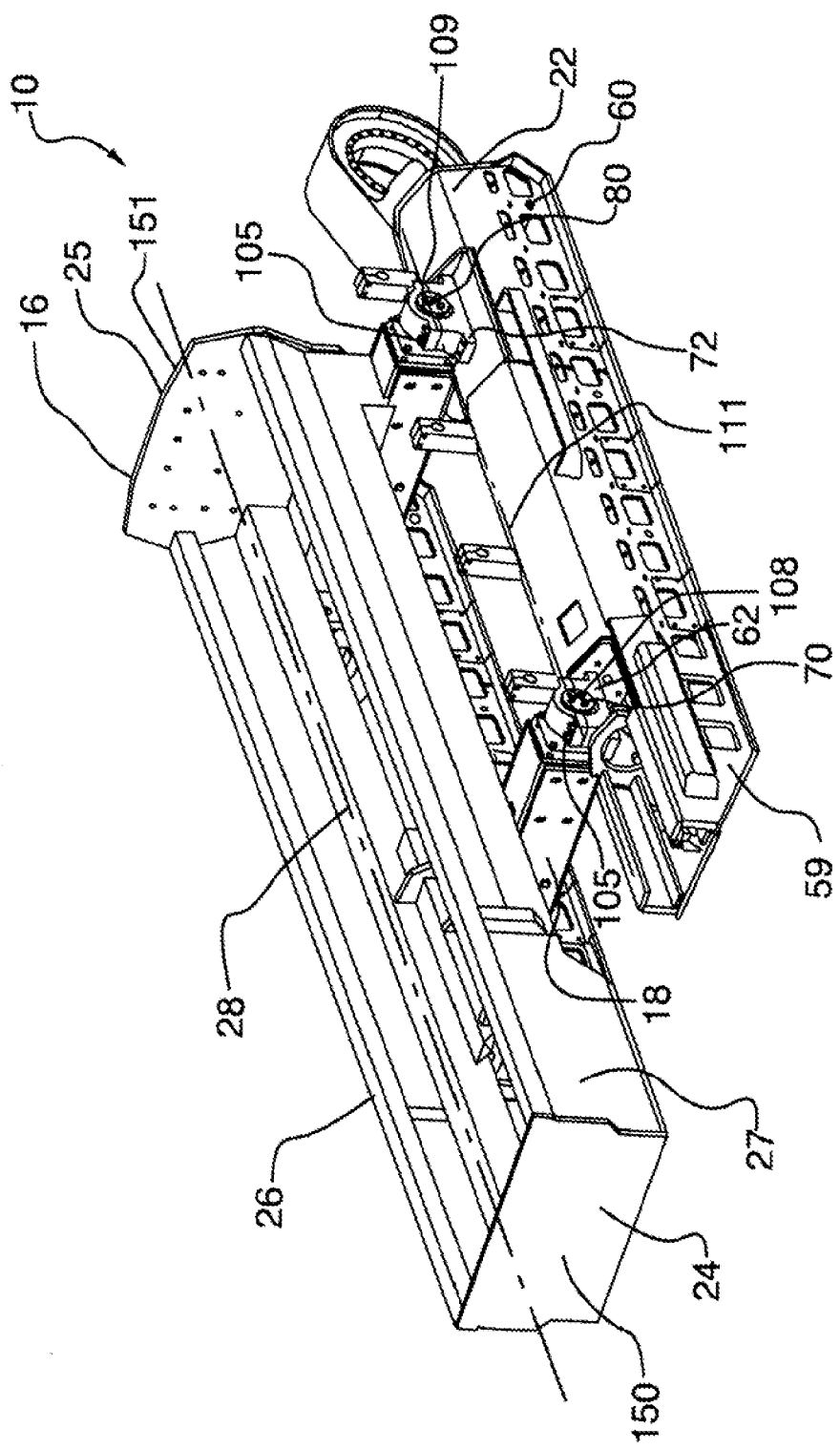
FIG. 2b is a perspective view of the other side of the undercarriage shown in FIG. 1.

Referring to FIG. 2a, the undercarriage 10 includes a main frame 16, which is made up of a frame body 17 and an equalizer bar 18, a first track frame 20 and a second track frame 22 (FIG. 2b). The frame body 17 may be a solid weldment made up of a plurality of structural members, which is configured to support the vehicle body, the cab, the engine and the functional structure (eg. a drainage plow structure in the exemplary embodiment shown). The frame body 17 has a front end 24 and a rear end 25, which together define a longitudinal axis 28 for the undercarriage 10. The frame body 17 further has a first side 26 and a second side 27. The main frame 16 itself has a front end 150 and a rear end 151.

Figure 3:
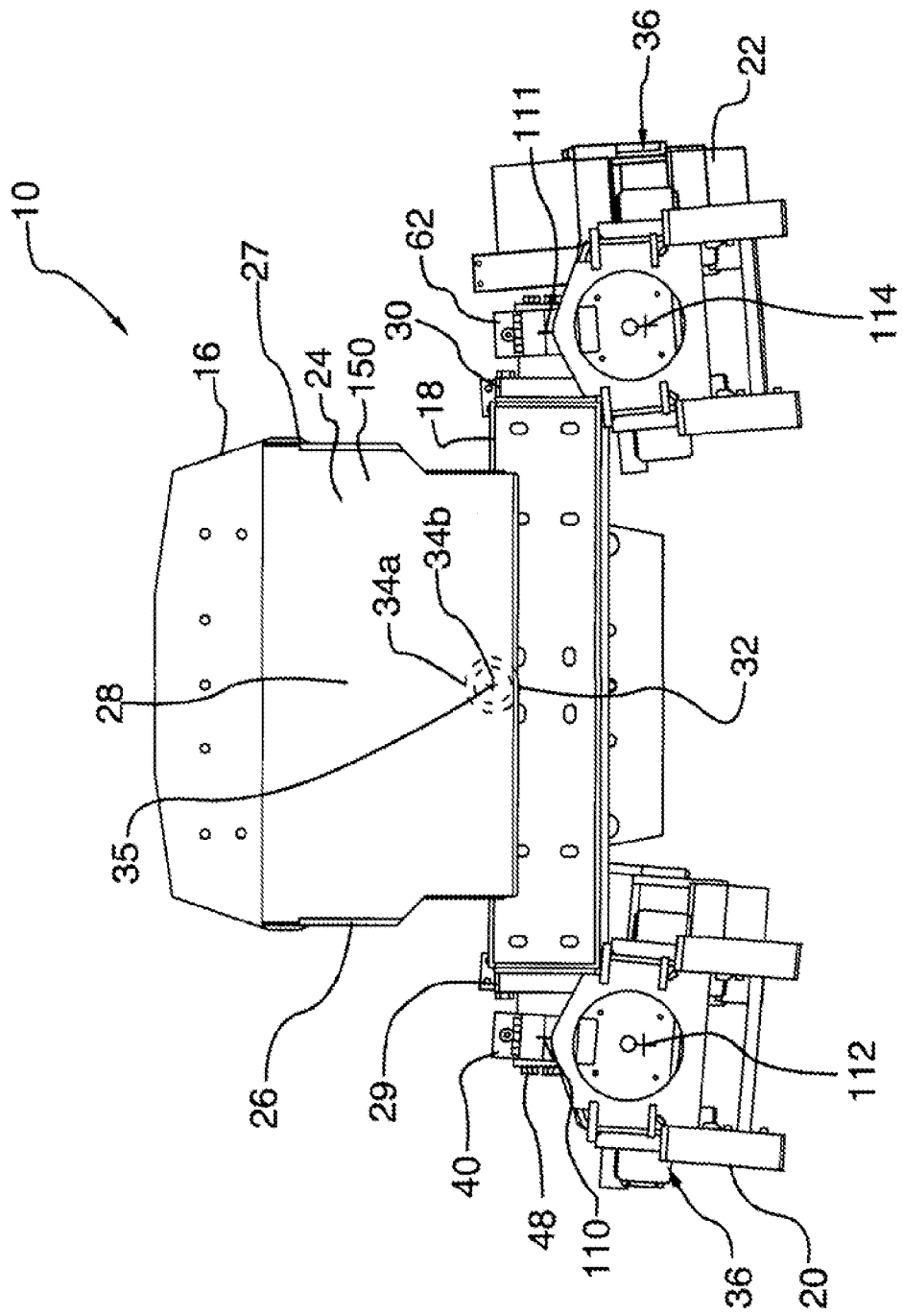
FIG. 3 is a front elevation view of the undercarriage shown in FIG. 1.

Referring to FIG. 3, the equalizer bar 18 extends laterally relative to the main frame 16 and has a first lateral end 29 and a second lateral end 30. The equalizer bar 18 is mounted pivotally to the front end 24 of the frame body 17 via a pivot joint 32. The pivot joint 32 may have any suitable structure, such as a cylindrical tubular member 34a that is rotatable about a cylindrical core member 34b and permits pivoting of the equalizer bar 18 about an equalizer bar pivot axis 35, which extends longitudinally (ie. which extends parallel to or co-linearly with the longitudinal axis 28).

Figure 4:
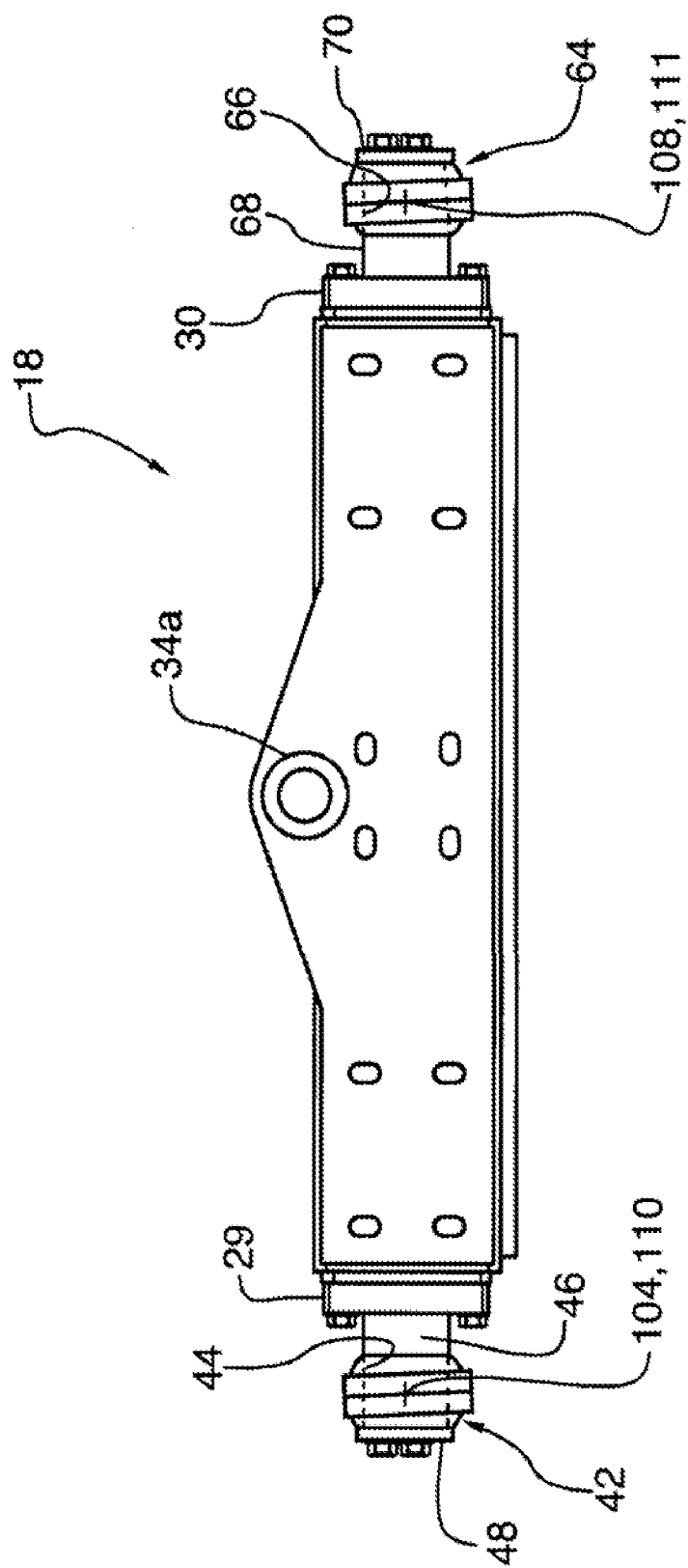
FIG. 4 is a front elevation view of an equalizer bar that is part of the undercarriage shown in FIG. 1.

Referring to FIG. 2a, the first track frame 20, which is provided on the first side 26 of the frame body 17, has a front end 36 and a rear end 38. At the front end 36 a first front pillow block 40 is provided, which holds a first front spherical bearing 42 (FIG. 4) therein. The spherical bearing 42 may be any suitable spherical bearing, such as one manufactured by FK Bearings of Southington, Conn. 06489, USA.

The spherical bearing 42 has a pass-through aperture 44, through which a laterally extending mounting shaft 46 passes. The mounting shaft 46 is provided at the first end 29 of the equalizer bar 18. A retainer plate 48 may be mounted to the outer end of the mounting shaft 46 to capture the spherical bearing 42 on the shaft 46. It will be noted that the outer race of the spherical bearing 42 is shown to be canted at an angle relative to the vertical in FIG. 4 to illustrate the type of movement that the bearing 42 is capable of. However, when the vehicle 12 is travelling over level ground, the outer race of the bearing 42 will be oriented vertically.

Referring to FIG. 2a, at the rear end 38 a first rear pillow block 50 is provided, which holds a first rear spherical bearing 52 (FIG. 5) therein. The spherical bearing 52 may be similar to the spherical bearing 42.

Figure 5:
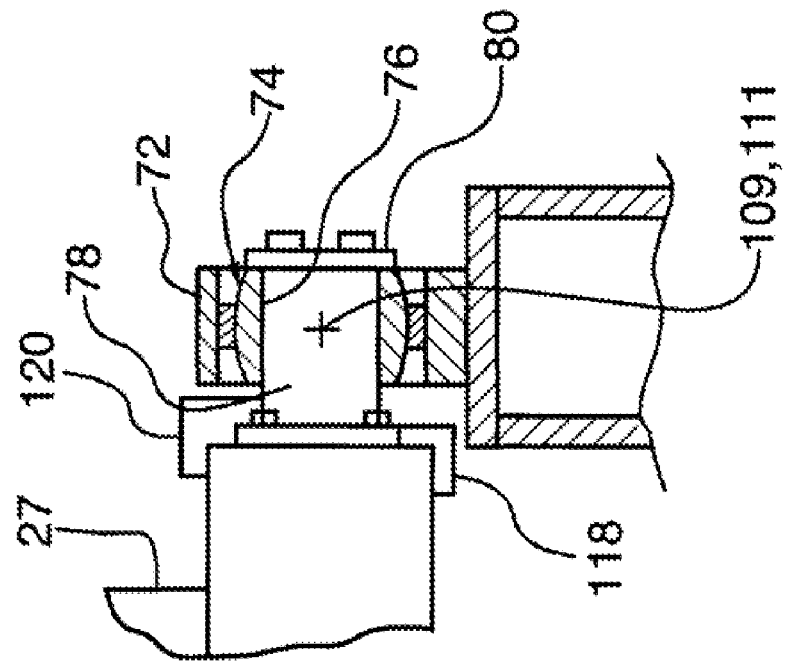
FIG. 5 is a front elevation view of a rear portion of the undercarriage shown in FIG. 1.
Figure 5:
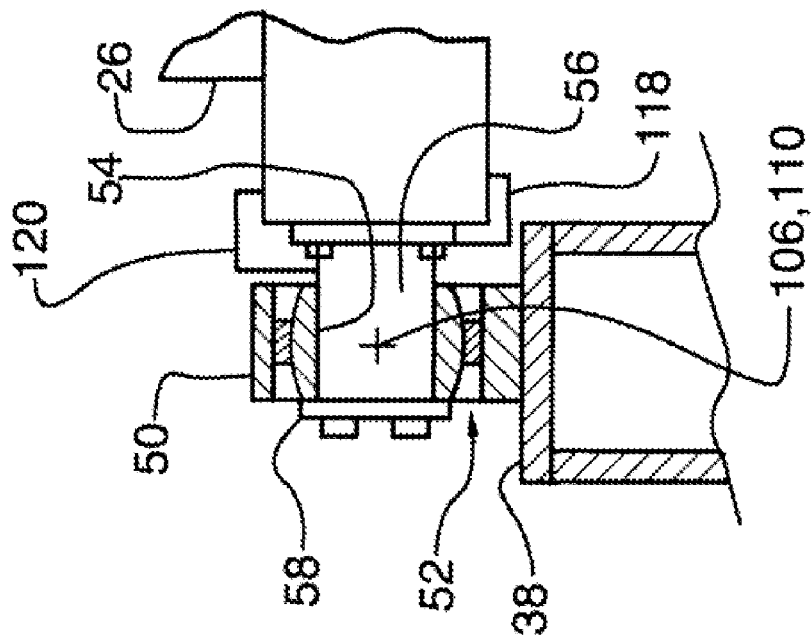

The spherical bearing 52 has a pass-through aperture 54, through which a laterally extending mounting shaft 56 passes. The mounting shaft 56 is provided at the rear end 25 (FIG. 2a) of the frame body 17 on the first side 26. Referring to FIG. 5, a retainer plate 58 may be mounted to the outer end of the mounting shaft 56 to capture the spherical bearing 52 on the shaft 56.

Referring to FIG. 2b, the second side 27 of the frame body 17 has a similar arrangement to the first side 26. The second track frame 22 has a front end 59 and a rear end 60. A second front pillow block 62 is provided at the front end 59 and holds a second front spherical bearing 64 (FIG. 4) therein. The second front spherical bearing 64 may be similar to the first front spherical bearing 42. The second spherical bearing 64 has a pass-through aperture 66 through which a laterally extending mounting shaft 68 passes. The mounting shaft 68 is provided on the second end 30 of the equalizer bar 18. A retainer plate 70 similar to the retainer plate 48 captures the spherical bearing 64 on the shaft 68. It will again be noted that the outer race of the spherical bearing 52 is shown to be canted at an angle relative to the vertical in FIG. 4 to illustrate the type of movement that the bearing 52 is capable of. When the vehicle 12 is travelling over level ground, the outer race of the bearing 52 will be oriented vertically.

Referring to FIG. 2b, at the rear end 60 of the second track frame 22 a second rear pillow block 72 is provided, which holds a second rear spherical bearing 74 (FIG. 5) therein. The second rear spherical bearing 74 may be similar to the first rear spherical bearing 52.

The spherical bearing 74 has a pass-through aperture 76, through which a laterally extending mounting shaft 78 passes. The mounting shaft 78 is provided at the rear end 25 (FIG. 2b) of the frame body 17 on the second side 27. Referring to FIG. 5, a retainer plate 80 may be mounted to the outer end of the mounting shaft 78 to capture the spherical bearing 52 on the shaft 78.

By providing horizontally extending mounting shafts the assembly of the main frame 16, equalizer bar 18 and track frames 20 and 22 can be carried out relatively simply. The mounting shafts 46 and 56 may be connected to the equalizer bar 18 and the equalizer bar 18 may be connected to the main frame 16. The mounting shafts 68 and 78 may be connected to the rear end 25 of the frame body 17. The spherical bearings 42, 52, 64 and 74 may be mounted to the mounting shafts 46, 56, 68 and 78 respectively. The pillow blocks 40, 50, 62 and 72 may be mounted over the spherical bearings 42, 52, 64 and 74 respectively. The assembly including the main frame 16, the equalizer bar 18, the mounting shafts 46, 56, 68 and 78, the spherical bearings 42, 52, 64 and 74 and the pillow blocks 40, 50, 62 and 72 may be lowered onto the first and second track frames 20 and 22. The positions of the pillow blocks may be adjusted so that mounting apertures in the pillow blocks may be brought into alignment with mounting apertures in the track frames 20 and 22, at which point fasteners, such as bolts (shown for example at 105 in FIGS. 2a and 2b), may be used to fasten the pillow blocks to the track frames 20 and 22.

Referring to FIG. 2a, the spherical bearings 42 and 52 have centers of rotation shown at 104 and 106 respectively, which define a first axis of rotation 110 for the first track frame 20. Referring to FIG. 2a, the spherical bearings 64 and 74 have centers of rotation shown at 108 and 109 respectively, which define a second axis of rotation 111 for the second track frame 22.

Furthermore, referring to FIG. 3, the track frames 20 and 22 have centers of mass shown at 112 and 114 respectively. The lateral position of the first axis of rotation 110 compared to the lateral position of the center of mass 112 of the track frame 20 determines whether gravity causes a moment on the track frame 20 that is resisted by the ground on which the track frame 20 travels. If there is a gravity-induced moment on the track frame 20, then the track 14 (FIG. 1) on the track frame 20 will tend to wear unevenly across its width and will have reduced traction. Preferably, the axis of rotation 110 (FIG. 3) is at the same lateral position as the center of mass 112 of the track frame 20, so that there is no gravity induced moment on the track frame 20. As a result, when the vehicle 12 is driving over level ground, the track 14 (FIG. 1) on the track frame 20 would tend to wear evenly across its width. Similarly, it is preferable for the axis of rotation 111 (FIG. 3) to be at the same lateral position as the center of mass 114 of the track frame 22, so that there is no gravity induced moment on the track frame 22.

Referring to FIG. 3, the height of the axis of rotation 110 relative to the center of mass 112 of the track frame 20 also plays a role in the performance of the undercarriage 10. More specifically, if the spherical bearings 42, 52, 64 and 74 are positioned such that the axes of rotation 110 and 111 extend above or below the centers of mass 112 and 114 respectively, as the track frames 20 and 22 rotate about the axes 110 and 111, the centers of mass 112 and 114 will become more and more laterally offset from the axes of rotation 110 and 111. As a result, moments will be created on the track frames 20 and 22 as gravity urges the track frames 20 and 22 towards a stable position of reduced potential energy. Such moments are detrimental to the performance (eg. reduced traction) and longevity (eg. non-uniform wear) of the tracks 14 (FIG. 1).

For each spherical bearing 42, 52, 64 or 74, there may be first and second limit members 118 and 120 provided to limit the amount of rotation that is permitted by the track frames 20 and 22 about the axes of rotation 110 and 111. Limiting the ranges of rotation of the track frames 20 and 22 inherently imposes limitations on the topography of the terrain on which the vehicle 12 can drive while keeping its tracks 14 flat to the ground. By selecting the positions of the limit members 118 and 120 one can inhibit the vehicle 12 from being driven over terrain that would impose a risk of tipping the vehicle 12 over. It will be understood that the selected positions of the limit members 118 and 120 will be based at least in part on the position of the center of mass of the vehicle 12. It will be noted that, while a limit member 118 and a limit member 120 may be provided in association with each spherical bearing 42, 52, 64 and 74, the limitations on the range of rotation can be achieved using only one limit member 118 and one limit member 120 for each track frame 20 and 22.

The limit member 118 and the limit member 120 may simply be resilient (eg. rubber) members mounted to the main frame 16 that are positioned relatively close to selected portions of the track frames 20 and 22, as shown in FIG. 5.

The range of movement that is provided about the axes of rotation 110 and 111 may be any suitable range, such as, for example, about 15 degrees.

During operation of the vehicle 12, as the vehicle 12 over uneven terrain, one of the track frames 20 or 22 may encounter a patch of ground that is at a different elevation than the patch of ground encountered by the other track frame 20 or 22, thereby prompting the equalizer bar 18 to pivot so that the front ends of the track frames 20 and 22 can accommodate the difference in their elevations. During pivoting of the equalizer bar 18, the front ends 36 of the track frames 20 and 22 rise and drop relative to the main frame 16, however, their movement is not strictly vertical; they instead move in an arc about the pivot axis 35. As a result, the front ends 36 are laterally offset from the rear ends 38 by some amount at any given position of the equalizer bar 18 that is off of horizontal.

By providing spherical bearings at both the front and rear ends 36 and 38, the track frames 20 and 22 can pivot as necessary to accommodate the lateral offset. Furthermore, even when the track frames 20 and 22 are level the provision of spherical bearings at both the front and rear ends 36 and 38 of the track frames 20 and 22 is advantageous in that it permits the vehicle 12 (FIG. 1) to drive on certain kinds of terrain with improved contact between its tracks 14 and the ground. For example, when driving along a road that is crowned, the spherical bearings permit the track frames 20 and 22 to angle downwardly so that the tracks 14 are approximately parallel with their local patch of road. By contrast, some vehicles of the prior art have connections at the rear ends of the track frames that substantially only permit pivoting about a lateral axis. As a result, such vehicles unfortunately do not permit the track frames to angle downward to accommodate terrain such as a crowned road. As a result, when such a vehicle drives on a crowned road (ie. most roads), the laterally inner edges of the tracks wear, while the laterally outer edges of the tracks do not engage the road. This can result in premature wear of the tracks, necessitating their eventual replacement, which is both costly and time-consuming. Providing the spherical bearings at the front and rear of the track frames 20 and 22 permits the tracks 14 to engage the road across relatively more of the width of the track 14, thereby inhibiting the premature wear that can occur with prior art vehicles.

Figure 6:
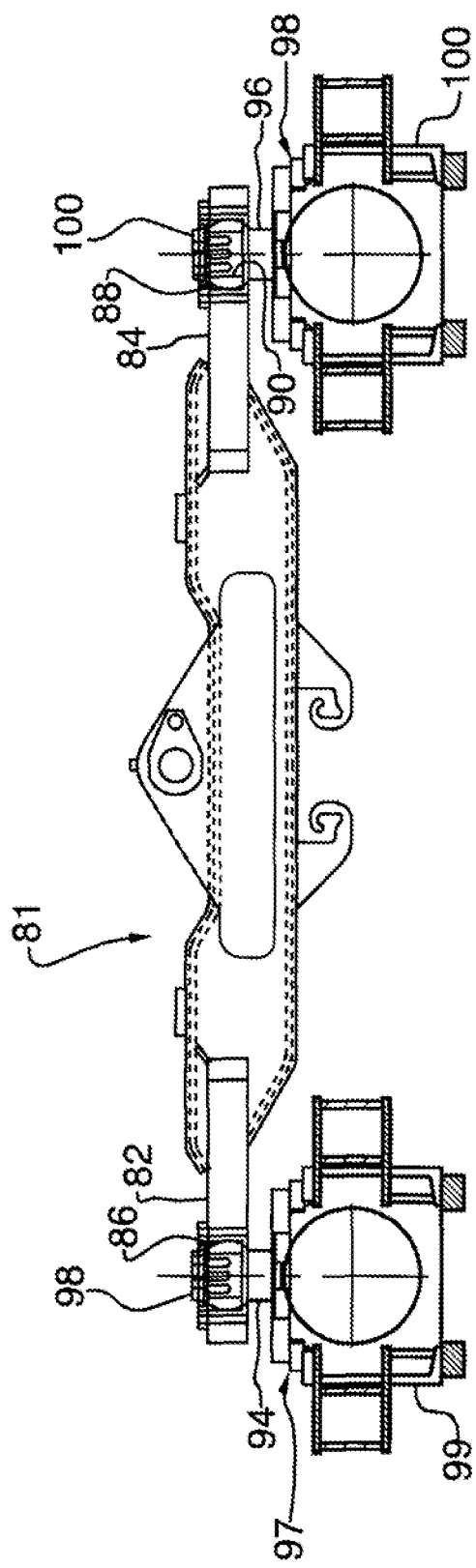
FIG. 6 is a front elevation view of an alternative equalizer bar for use in the undercarriage shown in FIG. 1.
Figure 7:
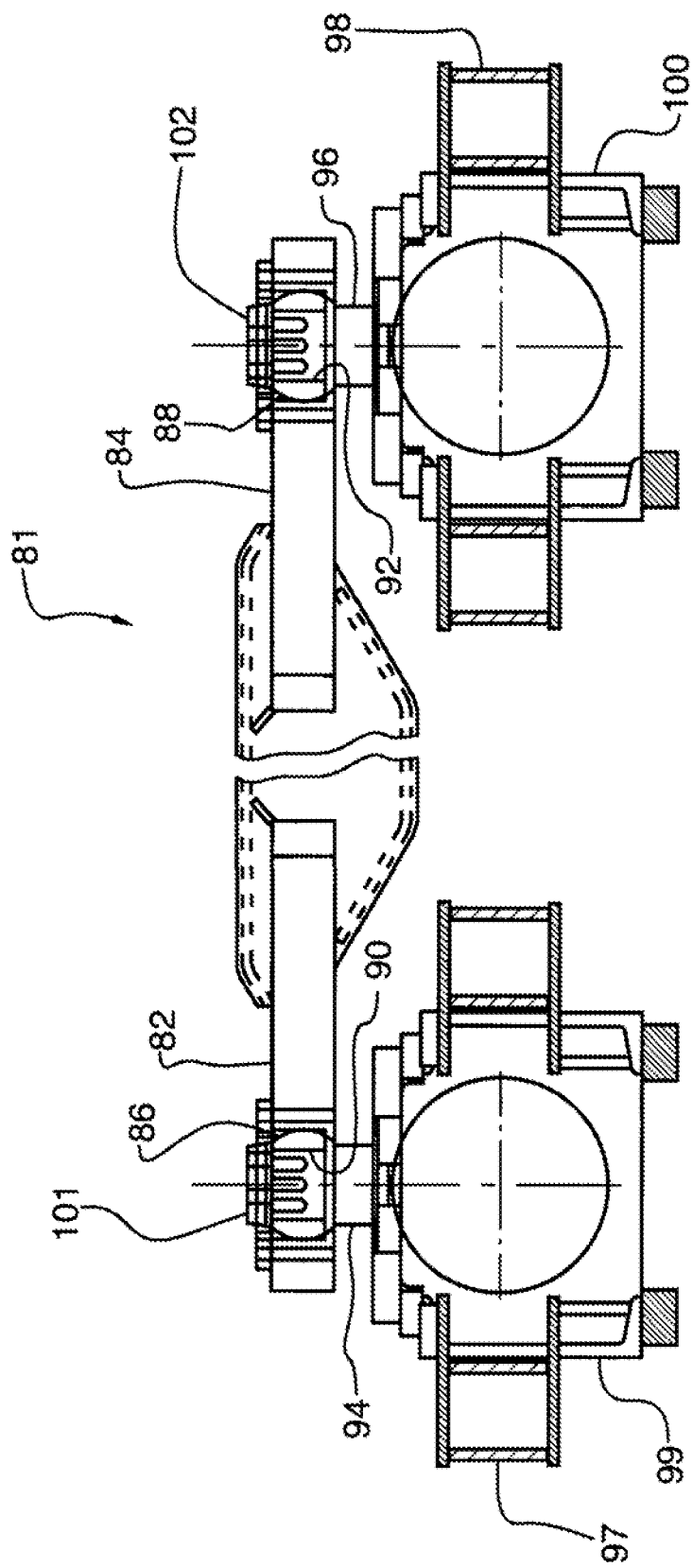
FIG. 7 is a magnified front elevation view of the equalizer bar shown in FIG. 6.

While it has been shown to orient the spherical bearings 42, 52, 64 and 74 such that their pass-through apertures extend horizontally, it is alternatively possible to configure the spherical bearings so that their pass-through apertures extend vertically. An example of such a structure is shown in FIG. 6, in which an alternatively configured equalizer bar 81 has bearing mounts 82 and 84 thereon, which hold spherical bearings 86 and 88 therein. As shown in FIG. 7 more clearly, the spherical bearings 86 and 88 have pass-through apertures 90 and 92 respectively, which are oriented vertically. In this alternative embodiment shown in FIG. 6, vertically oriented mounting shafts 94 and 96 are provided at the front ends 97 and 98 of the track frames shown at 99 and 100. The assembly including the main frame 16, the equalizer bar 18, the bearing mounts 82 and 84 and the spherical bearings 86 and 88 may then be lowered onto the vertically oriented mounting shafts 94 and 96 until the bearings 86 and 88 each engage a shoulder on each of the mounting shafts 94 and 96. Retainer plates 101 and 102 may be fastened to the ends of the shafts 94 and 96 to retain the bearings 86 and 88 thereon. In this alternative embodiment, the rear end 25 of the frame body 17 may still be provided with horizontally oriented shafts 56 and 78 that pass through horizontal apertures 54 and 76. Alternatively, it is possible that at the rear end 25, bearing mounts may be provided that are similar to the ones proposed on the equalizer bar 81 and that hold spherical bearings with pass-through apertures that are oriented vertically, and which mount on vertically oriented mounting shafts mounted at the rear ends of the track frames 99 and 100.

While it has been shown to provide the undercarriage 10 with an equalizer bar 16, it is optionally possible to provide the undercarriage 10 without an equalizer bar 16. In such a case, the spherical bearings 42 and 52 connect the fronts of the track frames 20 and 22 to the main frame, which would be a fixed weldment.

Figure 8:
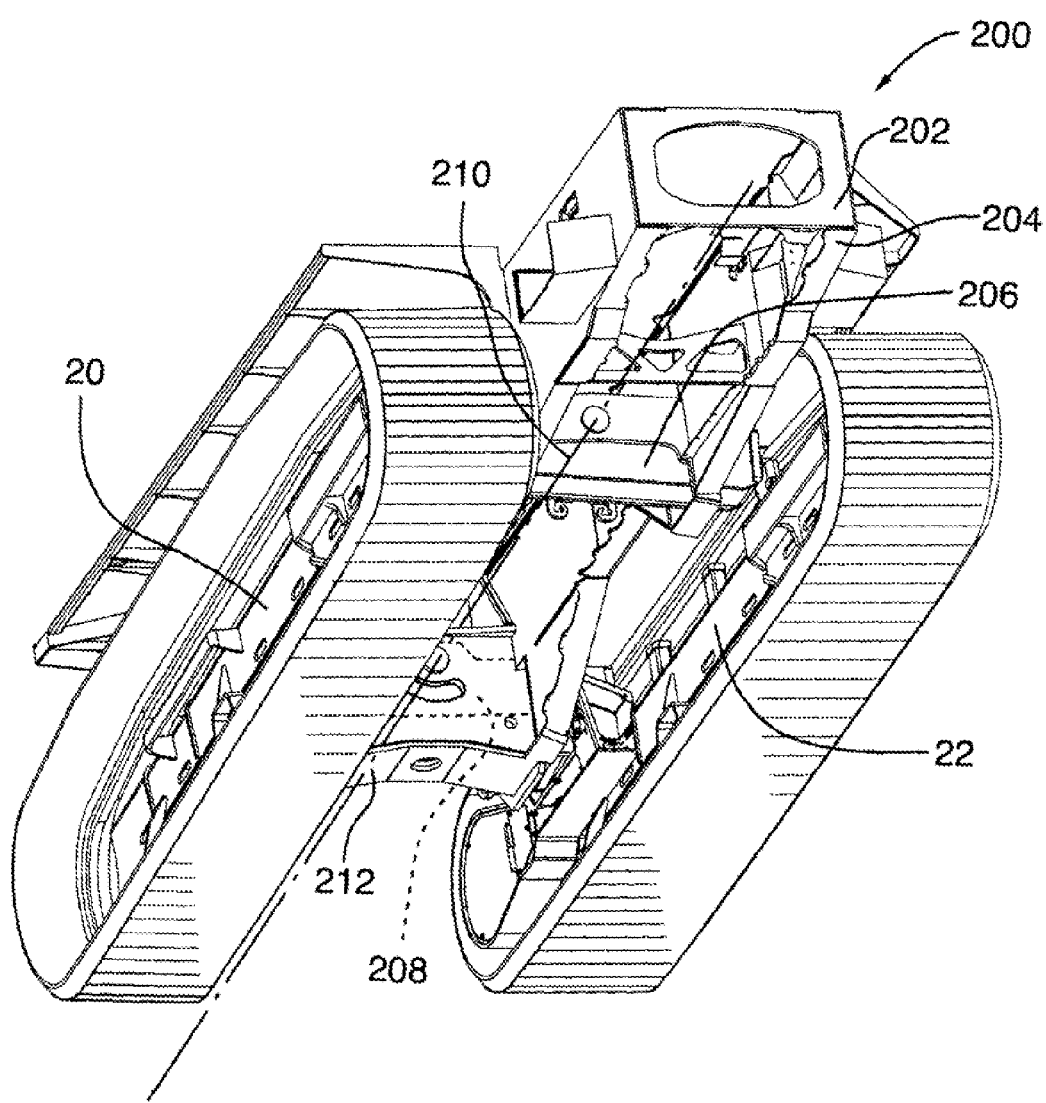
FIG. 8 is a perspective view of a tracked vehicle with an undercarriage in accordance with another embodiment of the present invention.

Reference is made to FIG. 8, which shows an undercarriage 200 for use in the tracked vehicle 12 instead of the undercarriage 10, in accordance with another embodiment of the present invention. The undercarriage 200 may be similar to the undercarriage 10, but with two modifications. One modification is that the main frame of the undercarriage 200 is shown at 202 and includes a frame body 204, a front equalizer bar 206 and a rear equalizer bar 208. The frame body 204 is similar to the frame body 17 (FIG. 1), except that it is configured for the mounting of two equalizer bars instead of one. The front and rear equalizer bars 206 and 208 may each be similar to the equalizer bar 18 shown in FIG. 3. The front equalizer bar 206 is mounted about a front equalizer bar pivot axis 210 which extends longitudinally (ie. which extends parallel to or co-linearly with the longitudinal axis of the main frame). The rear equalizer bar 208 is mounted about a rear equalizer bar pivot axis 212 which extends longitudinally (ie. which extends parallel to or co-linearly with the longitudinal axis of the main frame).

Figure 9:
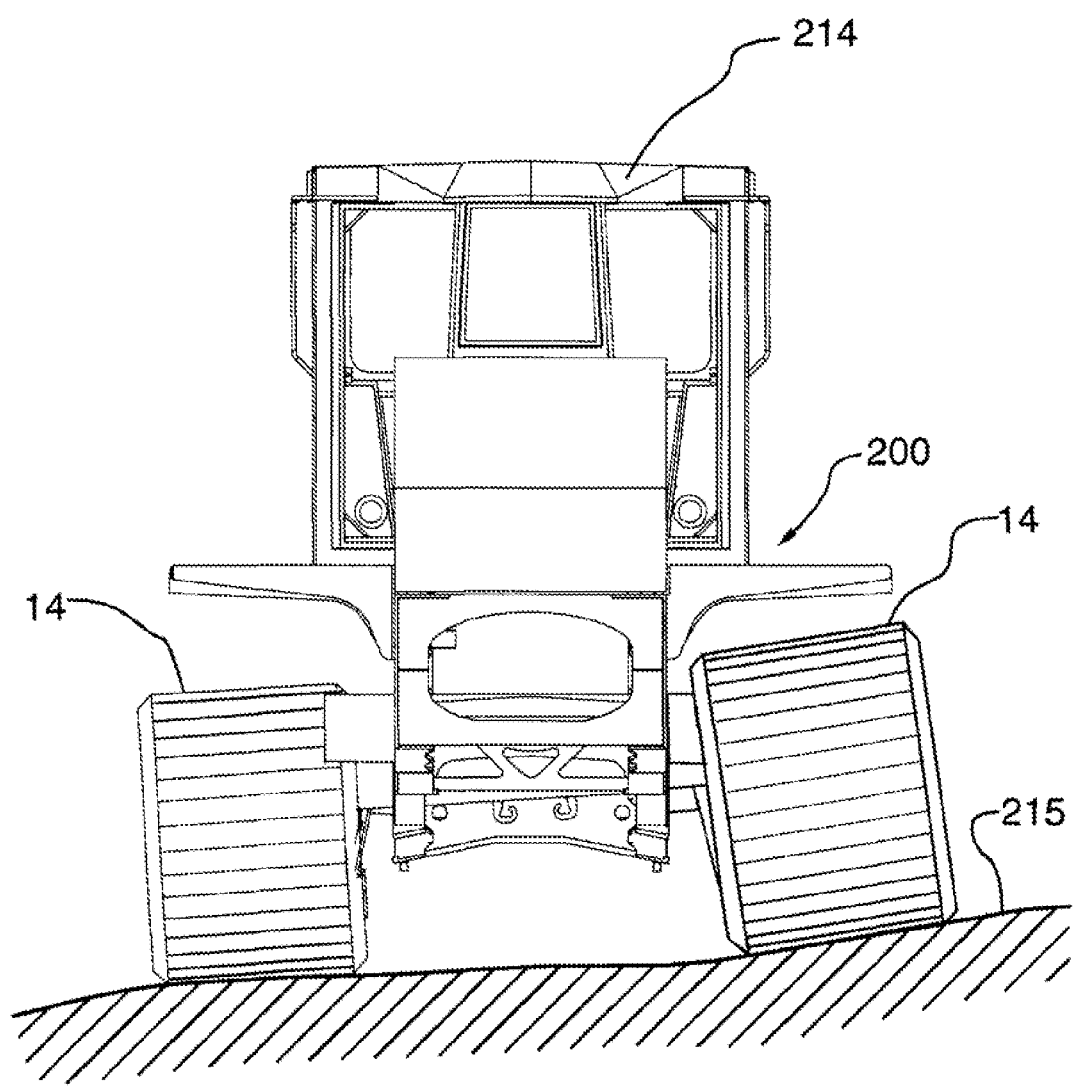
FIG. 9 is a rear elevation view of the tracked vehicle shown in FIG. 8 on uneven terrain.

By providing the front and rear equalizer bars 206 and 208 for the main frame 202, the main frame 202 has significantly increased flexibility in terms of the types of terrain that can be handled. As an example, the main frame 202 can hold the cab (shown at 214 in FIG. 9) upright while driving on terrain shown at 215 that is sloped downwards laterally. One or more hydraulic or pneumatic cylinders (not shown) can be provided between the frame body 204 and one or both equalizer bars 206 and 208 to control the angle of one or both equalizer bars 206 and 208 relative to the frame body 204. In a preferred embodiment, cylinders would be mounted between the frame and the rear stabilizer bar 208 on both sides of the pivot axis 212, and would be controlled by a hydraulic leveling system.

Another modification to the undercarriage 200 relative to the undercarriage 10 (FIG. 1) is that the undercarriage 200 incorporates a different type of spherical bearing. The spherical bearings in the undercarriage 200 are shown at 218, 220, 222 and 224 respectively in FIGS. 10a and 10b. The spherical bearings 218, 220, 222 and 224 may all be substantially identical, and may include a ball trunnion 226 (FIG. 11) and a ball trunnion support member 228.

In a preferred embodiment, the ball trunnion 226 is a cast steel member, and the ball trunnion support member 228 is also a cast steel member. As a result, it was found that surprisingly, the spherical bearings 218, 220, 222 and 224 do not require any lubrication. The bearings 218, 220, 222 and 214 are able to pivot as necessary during operation of the tracked vehicle 12 without the need for grease or oil to be present between the sliding surfaces shown at 230 and 232 of the ball trunnion 226 and the ball trunnion support member 228 respectively. By eliminating the need to lubricate the surfaces 230 and 232, a maintenance task on the vehicle 12 is eliminated, thereby saving time and cost.

Figure 10A:
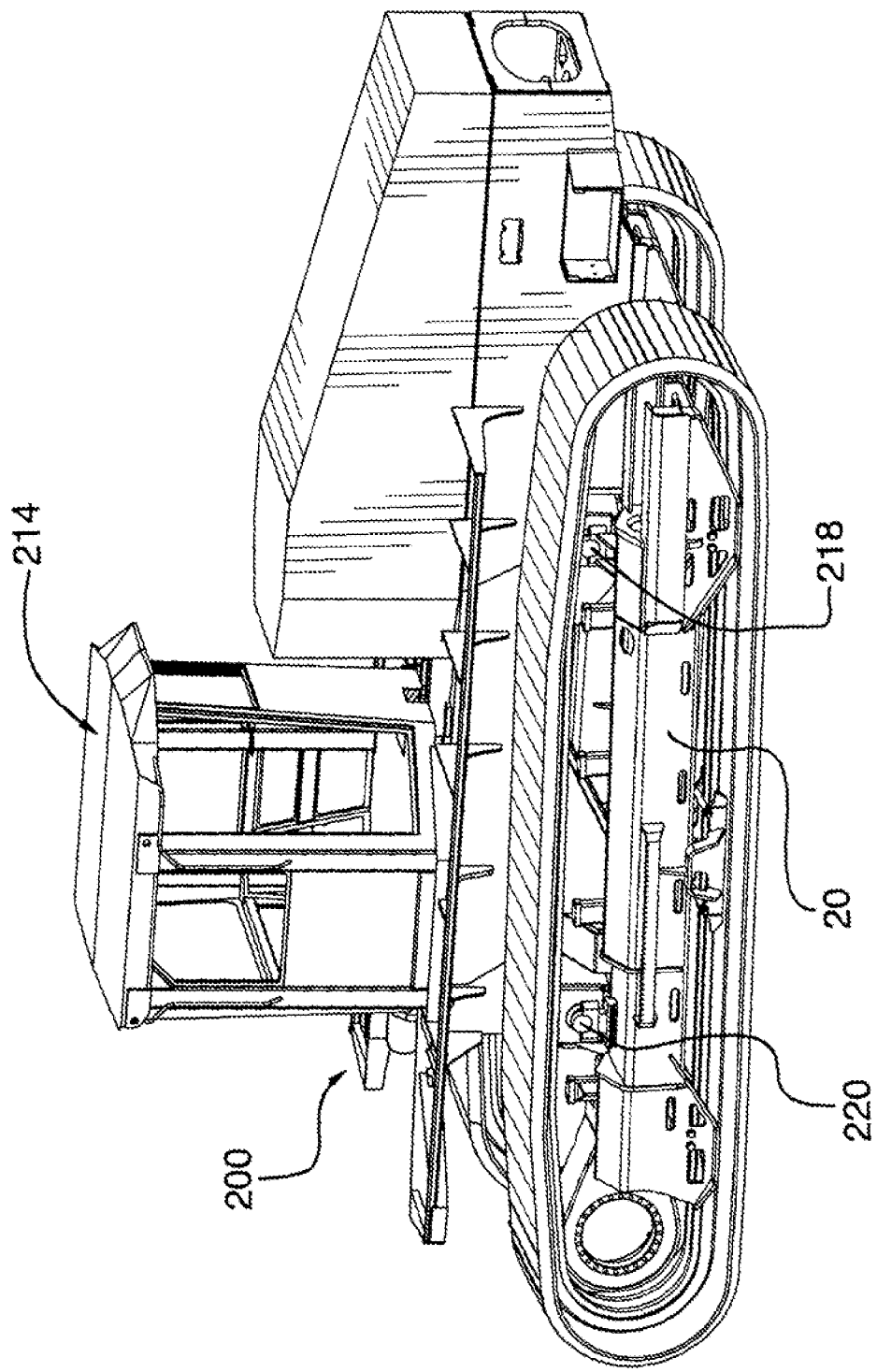
FIGS. 10a and 10b are perspective views of the undercarriage shown in FIG. 8.
Figure 10B:
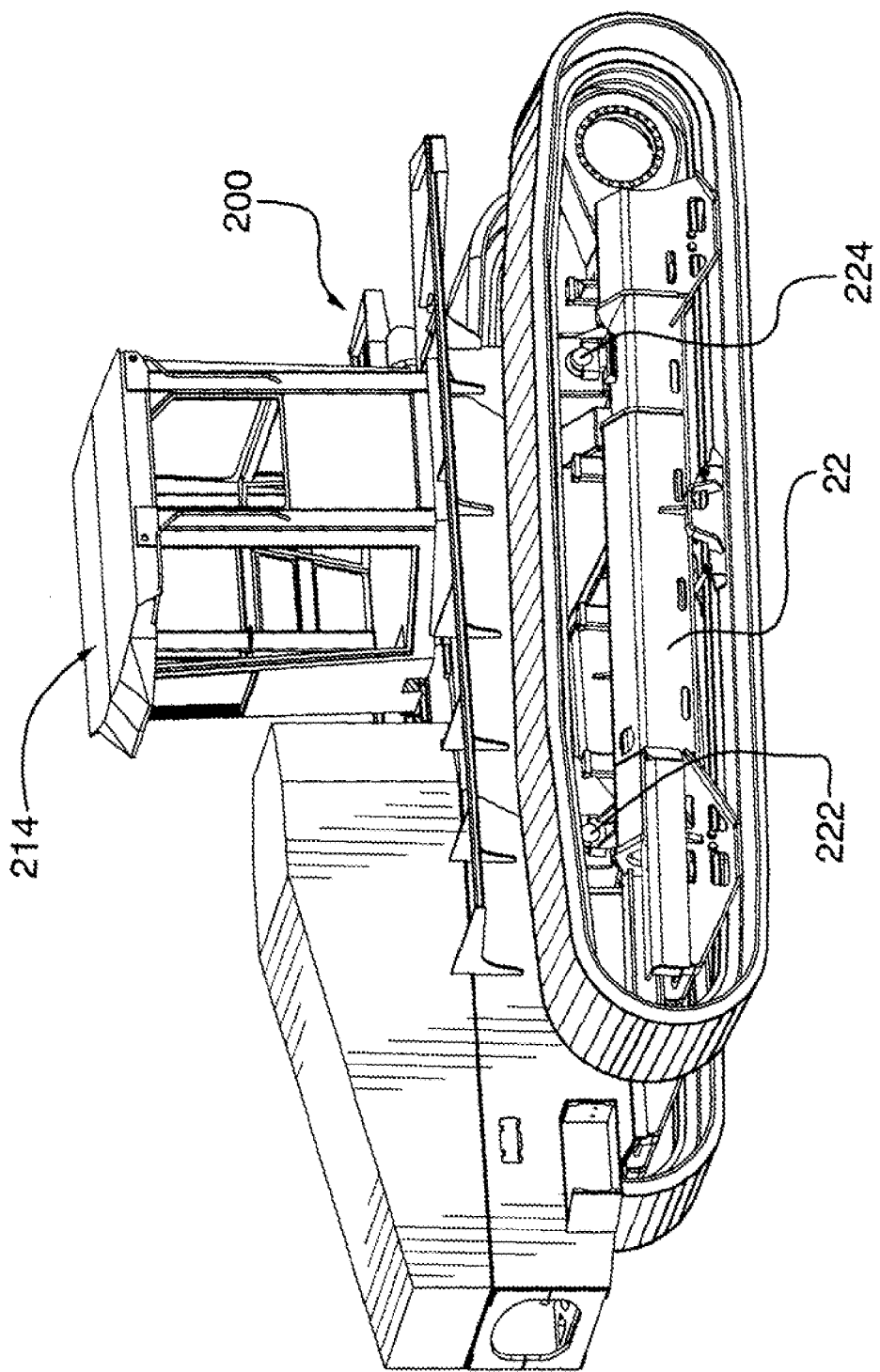
Figure 11:
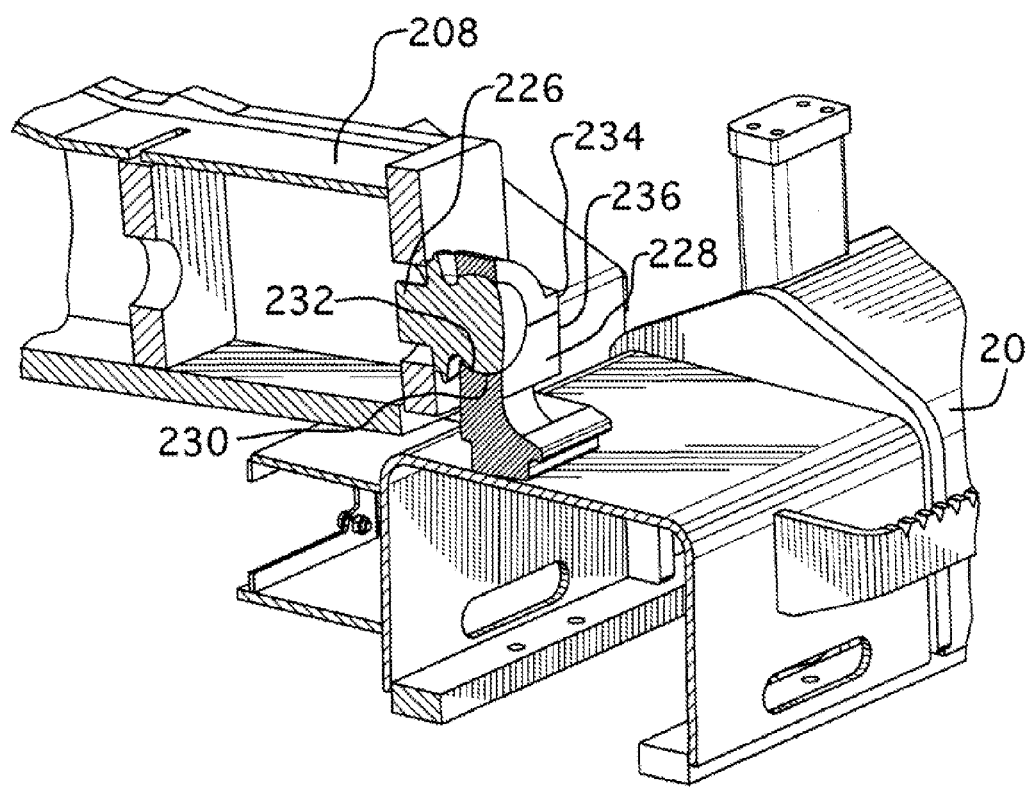
FIG. 11 is a magnified perspective sectional view of a portion of the undercarriage shown in FIG. 8.

The ball trunnion support members 228 may be in the form of pillow blocks as shown in FIGS. 10a and 10b, and may be split into upper and lower portions 234 and 236 for the introduction or removal of the ball trunnion 226 therefrom. It will be noted that the upper portions 234 of the ball trunnion support members 228 are not shown in FIGS. 10a and 10b, so as to permit illustration of the upper portions of the ball trunnions 226.

While the above description constitutes a plurality of embodiments of the present invention, it will be appreciated that the present invention is susceptible to further modification and change without departing from the fair meaning of the accompanying claims.

The invention claimed is:

1. An undercarriage for a tracked vehicle, comprising:
   a main frame having a front end and a rear end and defining a longitudinal axis and including a frame body having a front end and a rear end, and an equalizer bar extending laterally and having a first end and a second end, wherein the equalizer bar is mounted proximate the front of the frame body for rotation about a longitudinally extending equalizer bar pivot axis that is approximately centered laterally between the first and second ends of the equalizer bar;
   a first track frame and a second track frame each having a front end and a rear end;
   a first front spherical bearing connecting the first end of the equalizer bar and the front end of the first track frame;
   a second front spherical bearing connecting the second end of the equalizer bar and the front end of the second track frame;
   a first rear spherical bearing connecting the rear end of the main frame to the rear end of the first track frame; and
   a second rear spherical bearing connecting the rear end of the main frame to the rear end of the second track frame.

2. An undercarriage as claimed in claim 1, wherein each track frame has a center of mass, and wherein each spherical bearing has a center of rotation, wherein an axis of rotation for each track frame extends between the centers of rotation of the front spherical bearing and rear spherical bearing associated with each track frame, wherein the center of mass of each track frame has approximately the same lateral position as the axis of rotation for each track frame.

3. An undercarriage as claimed in claim 2, wherein the center of mass of each track frame has approximately the same vertical position as the axis of rotation for each track frame.

4. An undercarriage as claimed in claim 1, further comprising at least one first limit member and at least one second limit member associated with each track frame, wherein the at least one first and the at least one second limit members are positioned to limit the range of angular rotation available to the track frame.

5. An undercarriage as claimed in claim 4, wherein the positions of the at least one first limit member and the at least one second limit member are selected based at least in part on the position of the center of gravity of the tracked vehicle.

6. An undercarriage as claimed in claim 1, wherein each spherical bearing has a bearing pass-through aperture that extends laterally, and wherein one of the spherical bearings is supported at the front and rear ends of each track frame and wherein a front bearing mounting shaft extends laterally from each end of the equalizer bar and passes through the bearing pass-through aperture of each of the front spherical bearings, and wherein a rear bearing mounting shaft extends laterally from each side of the rear end of the main frame and passes through the bearing pass-through aperture of each of the rear spherical bearings.

7. An undercarriage as claimed in claim 6, wherein each spherical bearing is held in a pillow block which is mounted to one of the track frames.

8. An undercarriage as claimed in claim 6, wherein each spherical bearing is held in a pillow block which is removably fastened to one of the track frames.

9. An undercarriage as claimed in claim 1, wherein each front spherical bearing has a bearing pass-through aperture that extends vertically, and wherein a front bearing mounting shaft extends upwards from the front end of each track frame and passes through the bearing pass-through aperture on one of the front spherical bearings.

10. An undercarriage as claimed in claim 1, wherein the equalizer bar is a front equalizer bar and wherein the undercarriage further comprises a rear equalizer bar extending laterally and having a first end and a second end, wherein the equalizer is mounted to the rear of the frame body for rotation about a longitudinally extending rear equalizer bar pivot axis that is approximately centered laterally between the first and second ends of the rear equalizer bar.

11. An undercarriage as claimed in claim 1, wherein each spherical bearing is made up of a cast ball trunnion and a cast ball trunnion support member.

12. An undercarriage as claimed in claim 1, wherein each spherical bearing is made up of a cast steel ball trunnion extending laterally from the main frame or from the equalizer bar and a cast steel ball trunnion support member mounted one of the track frames, wherein the cast steel ball trunnion is supported on the cast steel ball trunnion support member and in use is movable relative to the cast steel ball trunnion support member without an externally supplied lubricant.

* * * * *